United States Patent [19]

Green

[11] Patent Number: 4,902,110

[45] Date of Patent: * Feb. 20, 1990

[54] VARIABLE TRANSMISSION OPTICAL DEVICE

[75] Inventor: Mino Green, London, United Kingdom

[73] Assignee: National Research Development Corp., United Kingdom

[*] Notice: The portion of the term of this patent subsequent to Mar. 1, 2005 has been disclaimed.

[21] Appl. No.: 772,455

[22] Filed: Sep. 4, 1985

[30] Foreign Application Priority Data

Sep. 4, 1984 [GB] United Kingdom ............. 8422262

[51] Int. Cl.$^4$ .................... G02F 1/01; G02F 1/17
[52] U.S. Cl. ................................. 350/357
[58] Field of Search .................. 350/357, 355, 258

[56] References Cited

U.S. PATENT DOCUMENTS

| | | | |
|---|---|---|---|
| 3,704,057 | 11/1972 | Beegle | 350/357 |
| 3,819,252 | 6/1974 | Giglia | 350/357 |
| 4,175,838 | 11/1979 | Randin | 350/357 |
| 4,253,742 | 3/1981 | Morita | 350/357 |
| 4,278,329 | 7/1981 | Matsuhiro et al. | 350/357 |
| 4,488,781 | 12/1984 | Giglia | 350/357 |
| 4,585,312 | 4/1986 | Ishiwata et al. | 350/357 |
| 4,728,177 | 3/1988 | Green | 350/357 |

FOREIGN PATENT DOCUMENTS

| | | | |
|---|---|---|---|
| 3338843 | 3/1984 | Fed. Rep. of Germany . | |
| 2274940 | 6/1975 | France . | |
| 3341384 | 6/1983 | Japan | 350/357 |
| 0105126 | 5/1984 | Japan | 350/357 |
| 2023867B | 1/1980 | United Kingdom . | |
| 2081922 | 8/1981 | United Kingdom . | |

OTHER PUBLICATIONS

R. D. Rauh, S. F. Cogan & M. A. Parker; Materials for Electrochromic Windows; SPIE vol. 502 Optical Materials Technology for Energy Efficiency & Solar Energy Conversion III (1984); pp. 38–45.

Svensson & Gravqvist; Electrochromic Coatings for "Smart Windows"; SEIP vol. 502 Optical Materials Technology for Energy Efficiency & Solar Energy Conversion III (1984); pp. 30–37.

Primary Examiner—Eugene R. Laroche
Assistant Examiner—Nathan W. McCutcheon

[57] ABSTRACT

A variable transmission window comprises outer panes of glass 17 and 19 and a multi layer electrochromic device allowing variation in the optical transmission properties of the window. The device comprises a transparent electrically conductive layer 12 such as indium tin oxide, an electrochromic material 13 such as a transition metal oxide bronze, a solid electrolyte 14 which is a fast ion conductor of ions of the metal which dissolves in the electrochromic material, a second electrochromic material 15, and a second transparent electrically conductive layer 16. The electrochromic material may be $MoO_3$ or $WO_3$. The solid electrolyte 14 may be a Bordeaux glass of LiCl, $Li_2O$, $B_2O_3$. A quantity of metal colouration atoms, for example lithium, may be transferred reversibly between the electrochromic layers 13 and 15 by applying potentials to contacts 21 and 22. A given quantity of metal coloration atoms produces a coloration of greater density in one electrochromic layer than in the other, for example by having one layer 15 thicker than the other layer 13.

17 Claims, 4 Drawing Sheets

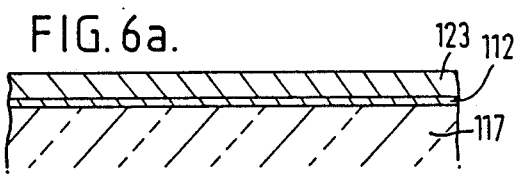
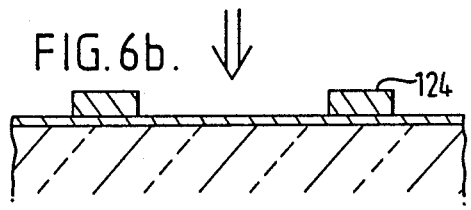
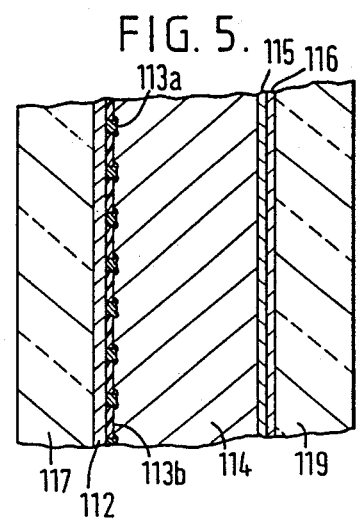
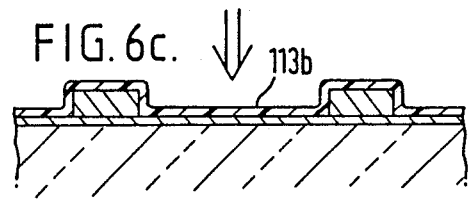
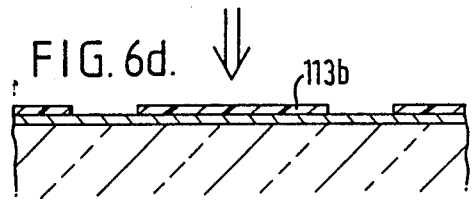
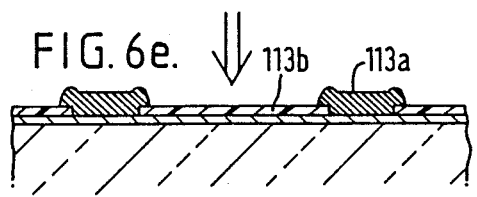

VARIABLE TRANSMISSION OPTICAL DEVICE

FIELD OF THE INVENTION

The present invention relates to a variable transmission optical device.

The present invention relates in particular to a variable transmission window, the term being used in a general sense for an optical device through which observation is to be made, and the term not necessarily being limited to a window in a building, although the invention has particular application to such windows. However, the invention will be applicable to other types of devices also.

ACKNOWLEDGEMENT OF PRIOR ART

Whilst it is known that the optical density of a layer of electrochromic material of the oxide bronze type can be varied the insertion or extraction of guest atoms achieved by the application of an electrical voltage in an electrochemical cell arrangement, and the use of such materials has been proposed for various types of display, a source of suitable ions is needed able to supply all of the necessary ions to the oxide bronze to bring about the colour change. In some systems proposed previously for use in displays, the source of ions is often a second layer of the same electrochromic material. Such a source layer would be expected to have a significant optical density which will tend to vary in opposition to that of the target electrochromic layer.

Where the source and target layers of electrochromic material are identical, no significant effect on overall optical density will be achieved by transfer of the relevant ions between them. Other suitable sources for the necessary ions such as alkali-metal ferrites are opaque.

In other systems proposed previously, hydrogen is used as the guest atom and is derived by electrolysis in the cell of traces of water absorbed from the air. Such systems are unlikely to be sufficiently durable for use as windows in most or all situations, particularly as water can corrode tungsten oxide layers.

Systems previously proposed for use in displays would therefore not be immediately suitable for use as well controlled variable density windows.

BRIEF DESCRIPTION OF THE INVENTION

According to the present invention there is provided a variable transmission optical device comprising a first layer of a transparent electrically conductive material, a first layer of an electrochromic material comprising a metal-sensitive compound which is capable of dissolving guest metal atoms and which changes colour in so doing, a layer of a transparent, solid electrolyte, the solid electrolyte being a fast ion conductor in which a fast ion is an ion of the metal which dissolves in the said metal-sensitive compound to change the colour thereof a transparent guest metal sink layer comprising a compound which is capable of dissolving the same metal atoms as the electrochromic layer, a second layer of transparent electrically conductive material, the said layers being positioned in the order specified, the said layer of solid electrolyte being in contact with the layer of electrochromic material and the guest metal sink layer, and the said first and second conductive layers being in contact with the electrochromic layer and the guest metal sink layer respectively, there being provided in the device a quantity of the said guest metal colouration atoms which may be transferred reversibly from the guest metal sink layer to the electrochromic layer by application of a potential difference between the said first and second electrically conductive layers, the layer of electrochromic material and the guest metal sink layer being chosen such that a given quantity of metal colouration atoms produces a colouration of greater density when dissolved in the electrochromic layer than when dissolved in the guest metal sink layer, whereby the overall optical absorption property of the device can be varied by transfer of metal atoms between the layer of electrochromic material and the guest metal sink layer.

It is to be appreciated that where reference is made to a metal-sensitive compound which is capable of dissolving metal atoms and which changes colour in so doing, the change in colour may be from transparent to a particular hue, or may be a change of colour from one hue to another, or may merely be a change in intensity in a particular hue without any change from one hue to another hue.

There are a number of ways in which the difference in colouration density referred to above may be achieved.

In one preferred arrangement according to the invention the guest metal sink layer is made of the same electrochromic material as the said electrochromic layer, and use is made of a property of the material that the efficiency of colouration of the electrochromic material by a given quantity of the said metal atoms varies with the thickness of the layer of material, the first and second electrochromic layers being of different thicknesses, the layer thicknesses being sufficiently different for the two layers to be operating at different efficiencies of light absorption for the said quantity of metal atoms which is transferable between the two layers.

The thickness of the thinner layer may for instance lie in the range 10 to 100 nm, more preferably 20 to 70 nm, e.g. about 40 nm.

The thickness of the thicker layer may for instance lie in the range 125 to 1250 nm, more preferably 250 to 900 nm, e.g. about 500 nm.

Naturally, larger thicknesses for the thinner layer will generally be associated with larger thicknesses for the thicker layer.

In another arrangement according to the invention, the guest metal sink layer is again of electrochromic material but the first and second electrochromic layers are formed of different electrochromic materials selected such that the electrochromic layers operate at different efficiencies of light absorption for the said quantity of metal atoms which is transferable between the layers. In such a case, the two electrochromic layers may be of the same thickness, or may be of different thicknesses. In the latter case, it may be arranged that the difference in thickness is such as to enhance the different efficiencies of light absorption of the two electrochromic layers.

In this type of embodiment it is particularly preferred that the guest metal sink layer be of an electrochromic material having a light absorption band such that the guest metal sink layer exhibits substantially no visible colour change on receiving or giving up the guest metal atoms. For this purpose, the guest metal sink layer may comprise as host material a solid solution of $MoO_3$ and $V_2O_5$.

Preferably, the formula ratio of $MoO_3$ to $V_2O_5$ is from 1:3 to 3:1, more preferably 1:2 to 2:1, most preferably about 1:1. The most preferred guest metal atom for such a system is lithium but the other guest metal atoms mentioned herein may also be used.

In these first two types of embodiment the thickness of the electrolyte layer is preferably from 0.1 to 10 μm, more preferably about 1 μm.

In a third type of embodiment, the guest metal sink layer may be made discontinuous over the layer of solid electrolyte, for instance as a network or as a multitude of islands of guest metal sind material. Such a network or such islands will occupy only a fraction of the surface area of the electrolyte and hence even when fully coloured will absorb only a fraction of light being transmitted the device. They may for instance occupy from 1/50 to ½ the available area, more preferably from 1/25 to ¼, e.g. about 1/10 the available area.

Thus, the guest metal sink layer may be transparent because of its discontinuous structure rather than because the guest metal sink material is transparent even when depleted of the guest metal atoms to the maximum extent.

The layer of electrochromic material is preferably continuous but may also be discontinuous, in which case it will occupy a different proportion of the respective electrolyte surface from the guest metal sink layer if the discontinuity is relied upon for the difference in colouring efficiency. Of course, layers of electrochromic material in devices according to the first and second preferred arrangement described above can also be made discontinuous if desired.

It will generally be necessary to arrange that the electrolyte is not in electrical contact with the said transparent electrically conductive material directly between the areas of guest metal sink material.

Preferably, therefore an insulating layer is provided between the solid electrolyte and the electrically conductive material having a pattern complimentary to that of the layer of guest metal sink material so that the islands of guest metal sink material occupy holes in the layer of insulating material or vice versa.

Such an insulating layer may be deposited by first providing over the respective surface of the electrically conductive material a layer of photo-resist, exposing the photo-resist with a pattern the negative of the desired insulating layer pattern, developing the photo-resist to leave a said negative pattern of photo-resist, depositing the insulating layer over the electrically conductive material and the photo-resist, and stripping off the photo-resist to leave the positive pattern of insulating material.

The guest metal sink material may then be deposited over the remaining area of the electrically conductive material, e.g. through a mask, such as a metal mask, held in registration with the positive pattern.

In some circumstances it may be possible to deposit the insulating layer and the guest metal sink layer on the solid electrolyte rather than on the said electrically conductive material.

Where islands of guest metal sink material are formed, they are preferably of an area corresponding to that of a circle of diameter from 5 to 100 μm, more preferably about 25 μm.

They may suitably be from 0.3 to 3 μm in thickness, preferably about 1 μm.

The thickness of the said electrically conductive material in contact with the discontinuous electrochromic layer is preferably from 0.1 to 0.7 μm, e.g. about 0.25 μm.

The solid electrolyte preferably has a thickness of from 5 to 120 μm, more preferably 15 to 60 μm, e.g. about 30 μm, and a resistivity of from $10^3$ to $10^8$ ohms cm, e.g. about $10^5$ ohms cm.

The guest metal sink material may be electrochromic material and may indeed be of the same nature as the said layer of electrochromic material.

In this type of embodiment no constructive use is made of any change in colour of the discontinuous guest metal sink layer even if it is of electrochromic material; it is used only as a convenient source of and sink for metal ions for insertion into, or removal from, the continuous layer of electrochromic material.

Accordingly, one may use in place of an electrochromic material in the discontinuous layer a material capable of supplying the metal ions needed but which is not electrochromic.

Suitable materials for the discontinuous layer will include fast ion conductor ferrites containing suitable metal ions, e.g. a lithium ferrite and also many other materials known in the art.

In some arrangements, the overall optical transmission properties of the optical device may be arranged to vary from translucent to opaque, or from transparent to translucent, or the variation in optical transmission properties may merely take the form of a greater or lesser degree of absorption of light within a generally translucent device.

Although in some arrangements where two electrochromic layers are used, potentials may be applied to the device which control the variation of optical transmission properties whilst still leaving some colouration atoms in each of the two electrochromic layers, it is preferred that the materials used, and the quantity of colouration atoms present, are such that substantially all the colouration atoms can be transferred from one electrochromic layer to the other by application of appropriate electrical potential differences between the two electrically conductive layers.

A convenient material which may be used for the or each electrochromic layer is an oxide bronze of a transition metal in its highest oxidation state. A preferred form of such material is an oxide of a transition metal selected from the group comprising tungsten oxide ($WO_3$), molybdenum oxide ($MoO_3$), vanadium oxide ($V_2O_5$), niobium oxide ($Nb_2O_5$), and iridium oxide ($IrO_2$) and various solid solutions of any two or more thereof.

It is a particularly preferred feature of the present invention that the said solid electrolyte may comprise a solid electrolyte of the kind known as Bordeaux glass containing LiCl, $Li_2O$ and $B_2O_3$.

Conveniently the fast ion is an alkali metal selected from the group comprising lithium, sodium and potassium.

BRIEF DESCRIPTION OF THE DRAWINGS

Embodiments of the invention will now be described by way of example with reference to the accompanying drawings in which.

FIG. 5 is a diagrammatic cross-section through a third type of variable transmission window according to the invention.

FIGS. 6a to 6e illustrate stages in providing various layers of the device of FIG. 5.

DETAILED DESCRIPTION OF THE INVENTION

Figure 1:
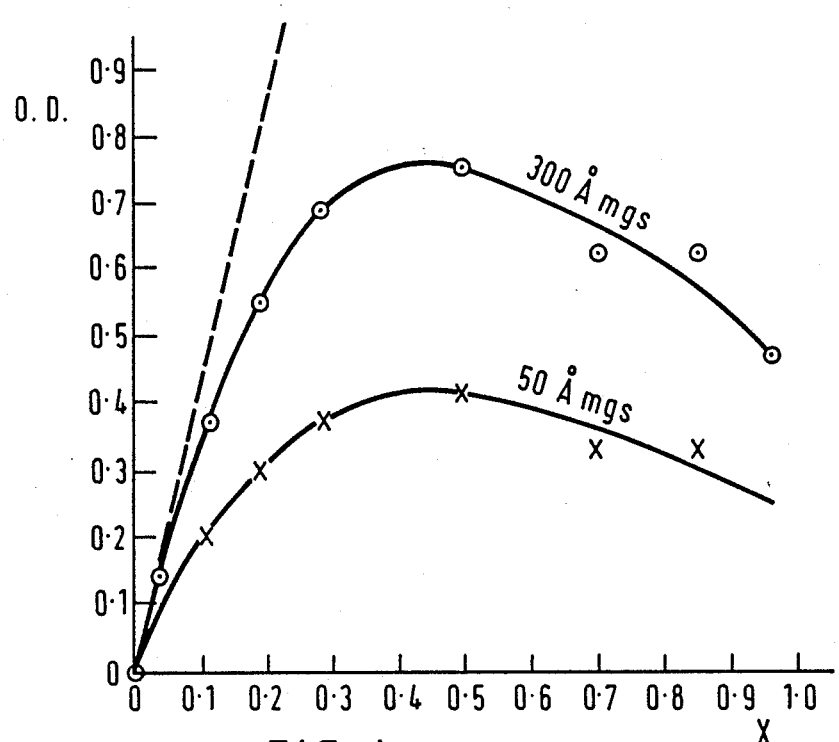
FIG. 1 is a graph showing variation of optical density (O.D.) with content of colouration atoms in electrochromic material, for two different thicknesses of materials.

There will first be described with reference to FIGS. 1 and 2, a simple explanatory system using sodium tungsten bronze. FIG. 1 shows the optical density (O.D.) at 555 nm, of a 250 nm thick sodium tungsten oxide film as a function of sodium content x, where x is the proportion of sodium in the formula $Na_xWO_3$. In the graph, two curves are shown for two different mean grain sizes, namely 300 Å mgs and 50 Å mgs. As an example, it can be seen that if there is a fixed amount of sodium in a film of $Na_xWO_3$ at $x=0.5$, there will be obtained a transmission $T_1$, and if that sodium is transferred to another film which is thicker so that x is lower, that film will be on a more "optically efficient" part of the curve, and the transmission $T_2$, will be less, that is to say $T_1 > T_2$.

Figure 2:
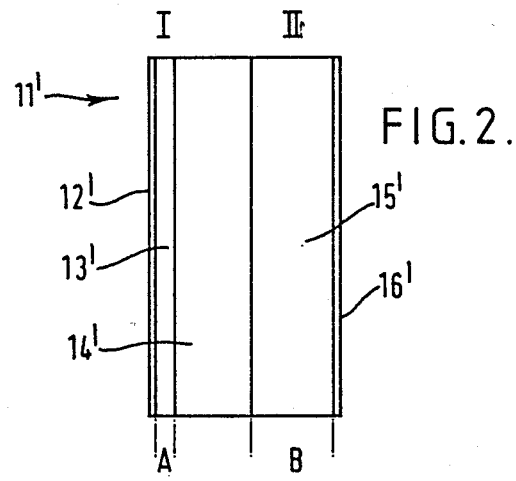
FIG. 2 is a diagrammatic representation of a variable transmission window embodying the invention.

FIG. 2 illustrates diagrammatically such an optical device 11'. The device comprises a first electrically conductive transparent layer 12'; a first layer of electrochromic material 13', such as tungsten oxide; a layer of a solid electrolyte 14' capable of conducting ions of the colouration atoms, for example lithium ions; a second layer of electrochromic material 15' such as tungsten oxide; and a second layer of transparent electrically conductive material 16'. Lithium atoms are dissolved in one or both of the electrochromic layers 13' and 15', and can be transferred reversibly between these two layers by passage of lithium ions through the solid electrolyte 14' under the effect of appropriate potential differences applied across the electrically conductive layers 12' and 16'. The sample shown in FIG. 2 is for 5.4 mC cm$^{-2}$ lithium.

The condition when all the lithium atoms are transferred to the first electrochromic layer 13' is referred to as condition I, and the condition when all the ions are transferred to the second electrochromic layer 15' is referred to as condition II. In condition I, all the lithium atoms are in the thinner, first electrochromic layer 13', of thickness A, and the content of lithium in that layer is then, say, $x=0.5$. in the equation $Li_xWO_3$. If the optical density required is 0.125 (75% T), a thickness A is required of 42 nm for material of 300 Å mean grain size, or 72 nm of material having 50 Å mean grain size.

In condition II, all the lithium is transferred to the second electrochromic material 15', of thickness B, for example a thickness of 500 nm, so that the value of x is $0.5/12=0.0415$. This gives an optical density of 0.32 (48% T).

If, however, the condition II is provided in molybdenum oxide, $MoO_3$, then the optical density is approximately 20% more, that is to say an optical density of 0.38 (42% T).

If the material in condition II is made of $3(MoO_3)\text{-}V_2O_5$, an optical density of 0.6 (25% T), is obtained with a 500 nm film and $x=0.0415$.

The example given with regard to sodium in tungsten oxide is by way of illustration of the principle only. Transmission ratios of 75/25 cannot be easily achieved with tungsten bronzes alone, but the materials suggested with reference to FIG. 2 can be used for a practical example. Of course, if it is chosen to take $x=1$ for the condition I in the examples of FIGS. 1 and 2, the desired variable transmission ratios can be readily achieved. But with sodium, it is not possible to move the metal reversibly at such high concentrations. Lithium, however, can certainly be moved reversibly up to concentrations of $x=0.7$. It has been established that lithium and sodium behave in a similar way optically so that the above data of FIG. 1 may be taken to apply also to lithium. Furthermore, it has been established that lithium has a higher room temperature mobility than does sodium and may be arranged to be transferable in, say, 60 seconds at temperatures as low as $-20°$ to $-30°$ C. and faster at higher temperatures.

Figure 3:
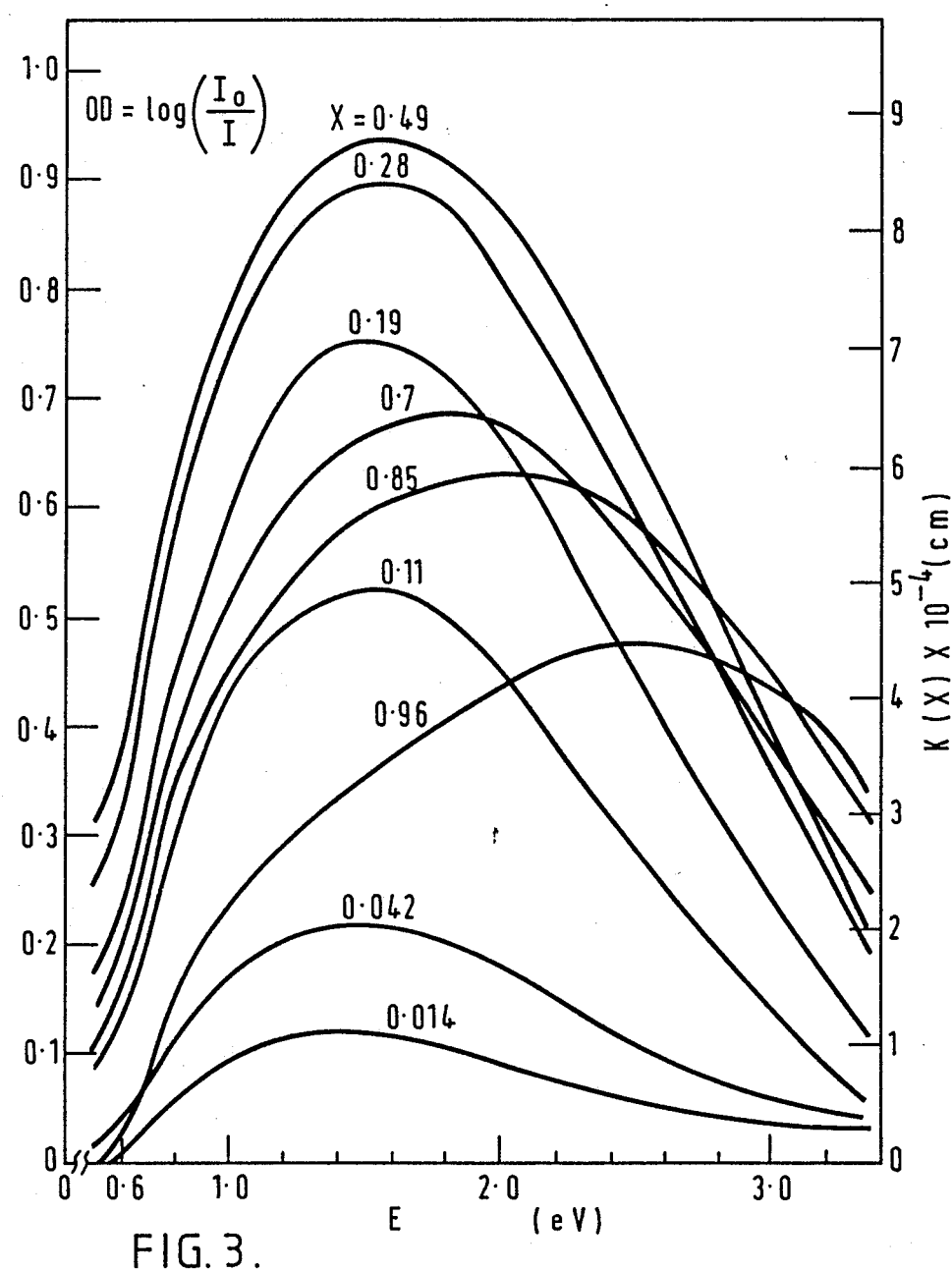
FIG. 3 is a graph showing variation of optical density with photon energy for a number of different thicknesses of sodium tungsten bronze film.

If the arrangement of FIG. 2 is to be used for variable transmission windows with a large shift in optical density, it is necessary to use materials with modified optical properties. The optical absorption band which is associated with tungsten bronze formation has the form shown in FIG. 3. The absorption processes associated with this band are interband transitions of electrons in the tungsten oxide, $WO_3$, conduction band to higher empty conduction band states and to empty alkali metal ion states. Also, for higher concentrations especially, there will be variations arising from the nature of the alkali metal. But more important, since the action is concerned with interband transitions, there is to be expected, and seen, a variation in absorption band position (i.e. function of wave length) with host, that is to say for different types of electrochromic material. So tungsten oxide, $WO_3$, gives a different absorption peak position, for the same value of x, from that given by, say, molybdenum oxide $MoO_3$, or vanadium oxide $V_2O_5$. Furthermore, solid solutions of, for example, tungsten oxide and molybdenum oxide, $WO_3/M_oO_3$, have modified energy bands and a consequently modified absorption band.

Suitable host materials for the arrangement of FIG. 2 include $WO_3$, $MoO_3$, a combination of $V_2O_5\text{-}Nb_2O_5$, and various solid solutions of these materials.

If there is a sufficient inherent difference in colouration efficiencies between the two electrochromic layer materials, the layers may be of equal thickness.

A host material which is a solid solution of $MO_3$ and $V_2O_5$, preferably in a formula ratio of 1:1, will exhibit little or no visible colouration at thicknesses up to 1 μm when the guest metal sink level is such that x is up to 0.4 at least. Such materials are accordingly the most preferred for use in windows according to the invention as the guest metal sink layer. Preferably such a layer is of the formula $Li_{0.1} MoO_3\text{-}V_2O_5$ and is approximately 0.2 μm thick.

Suitable guest metal atoms include Li and Na. With optical absorbers, with even modestly modified absorption peaks, a ratio of 75/25 or even 90/10 can be achieved. This is best done with material having lithium with a relatively high mobility.

With regard to the solid electrolyte 14' in the arrangement of FIG. 2, a suitable lithium containing solid electrolyte is a material knows as "Bordeaux-glass", consisting of a combination of LiCl, Li$_2$O, and B$_2$O$_3$ with a room temperature resistivity of 10$^6$ ohm cm. The electrical requirement is undemanding. For a layer 10$^6$ ohm cm, 1 micron thick, there is a requirement of 100 ohms/cm$^2$ and 6 mC/cm$^2$ in 60 seconds, which is 10$^{-4}$ amps/cm$^2$, so that the resistive voltage drop would be 0.01V. Even if the resistivity were 10$^9$ ohm cm, the voltage drop would be only 10V, which is very well within the current carrying capability of the various interconnections which are provided. The Bordeaux glass can be readily deposited in thin film form but care must be taken in fabrication. Lithium glasses are usually strongly hygroscopic, especially the Bordeaux glass, which means they have to be handled in a rigorously dry atmosphere.

An alternative type of electrolyte for use in such a device is the type of polymer electrolyte developed at Grenoble, for example (LiClO$_4$) (PEO)$_8$ where PEO is polyethylene oxide unit in a polymeric material typically having a molecular weight of about 5 million. The thickness preferred for such an electrolyte is from 0.5 to 50 $\mu$m, e.g. about 1 $\mu$m.

Figure 4:
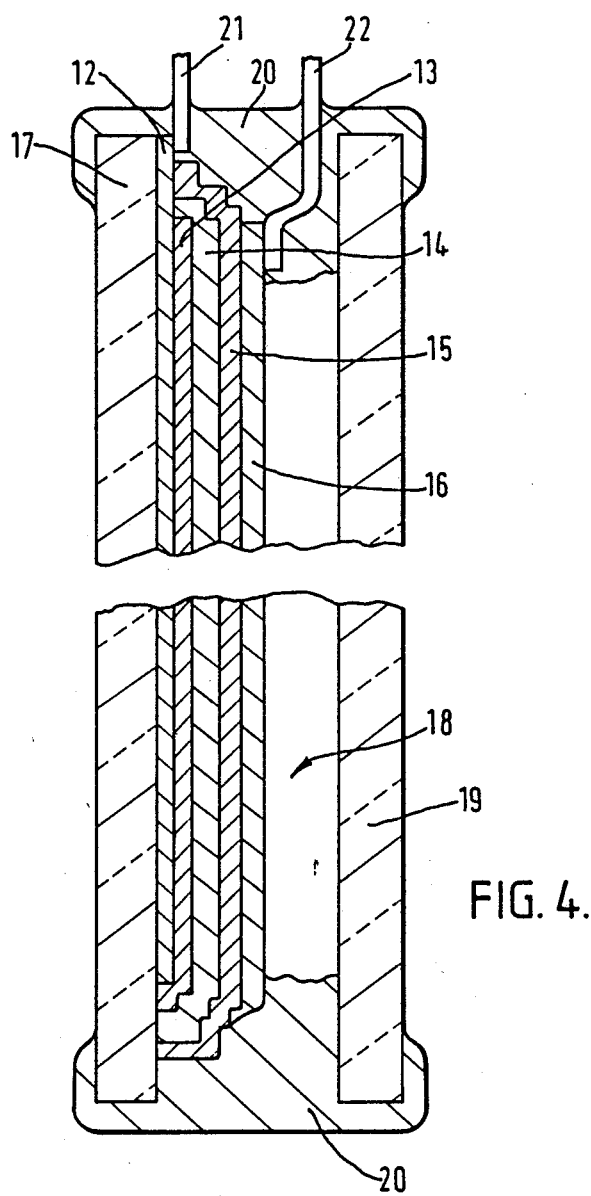
FIG. 4 is a diagrammatic cross-section through a variable transmission window of a kind suitable for use in a building.

In FIG. 4 there is shown diagrammatically, and not to scale, a practical example of a variable transmission window embodying the invention, suitable for use in a building. The device comprises a number of layers as follows, taken from left to right in the FIG. 4, namely a glass window pane 17, a layer of transparent indium tin oxide 12, a layer of a first electrochromic material 13, a layer of a solid lithium-containing fast ion conductor 14, a second layer of electrochromic material 15, a second transparent electrically conductive layer 16 of indium tin oxide, a spaced area 18 which may be filled with transparent material or may be a vacuum gap, and a second glass window pane 19. The edges of the device are sealed by epoxy seal 20, and contacts 21 and 22 lead to the indium oxide layers 12 and 16.

Fabrication of the device may be as follows. A glass window pane 17, coated in indium tin oxide (ITO) 12, has deposited on it a thin layer of electrochromic material such as an oxide bronze of a transition metal in its highest oxidation state. The conditions of deposition may be, for example, as set out in our previous patent GB 2081922 B. These general conditions should be observed throughout the fabrication. The next stage is that a double thin film deposition is made. First the solid electrolyte 14 suitably of the Bordeaux glass type is deposited and then, as a temporary encapsulating agent, the thick electrochromic host layer 15 is deposited with its lithium. (The lithium may be put in as a co-deposition with the host material 15, or as a subsequent step, from lithium butyl.) Next the second indium tin oxide layer 16 is deposited. This layer need not be better than approximately 10$^3$ ohms per square meter. During the deposition various stages of mechanical masking will be required, as will be clear to those skilled in the art. Finally the electrode leads 21 and 22 are attached and a second pane of glass 19 is put on and the edge seal 20 of epoxy resin is made.

Where a polymer electrolyte is used, one preferably deposits on a pair of glass panes a layer of ITO and a respective thick or thin electrochromic material layer. A coating of polymer electrolyte is applied over each electrochromic layer and the two sheets are brought together to bond the respective polymer electrolyte layers together.

As shown in FIG. 5, in a third type of embodiment, a window shown diagrammatically and not to scale comprises glass panes 117 and 119 between which are located active layers of the window illustrated. These comprise a first layer 112 of transparent electrically conductive material such as ITO deposited on the glass 117, a guest metal sink layer composed in part of islands 113$a$ of electrochromic material, the islands being separated by a network 113$b$ of insulating material forming holes in which are located the islands of layer 113$a$. The insulating layer is for instance SiO$_2$ or MgF$_2$. Next is a layer 114 of solid electrolyte followed by layers 115 and 116 of continuous electrochromic material and transparent electrically conductive material respectively.

The electrochromic material is, for the sake of example, Li$_x$ WO$_3$ and provides blue/black islands if x is chosen to be say 0.5. Generally x will be in the range 0.1 to 0.7, being higher where the layer thickness of the islands is chosen to be less.

This basic design uses the fact that small dark areas give the overall impression of grey.

The structure illustrated would, provided that the dark islands were small (e.g. 50 $\mu$m across) and closely spaced (e.g. 1/10 the area) appear grey, cutting out about 1/10 of the transmitted light. When the Li ions are partly transferred from the island sources to the planar WO$_3$ layer (sink) forming Li$_x$ WO$_3$, overall transmission will be reduced. Thus if one requires 75% of the light which would normally be transmitted (after 10% loss) to be absorbed in the uniform layer, then the Li$_x$ WO$_3$ film would require a composition of Li$_{0.2}$ WO$_3$, and a thickness of 0.25 $\mu$m (e.g. see K. Kang and M. Green, Thin Solid Films, 113 (1984) L29-32, for useful optical data). While lithium is the preferred ion for insertion and extraction, it is possible for slower devices to use a sodium based system.

The island electrodes must contain at least all the lithium that is to be inserted into the uniform electrochromic layer. Thus with the 10:1 ratio, the island electrode would be e.g. 1 $\mu$m thick and x would have the value 0.5 (in Li$_x$ WO$_3$). Of course, MoO$_3$, or V$_2$O$_5$ or Nb$_2$O$_5$ or various combinations of these materials with WO$_3$ or amongst themselves would be suitable.

The solid electrolyte would typically be polyethylene oxide/LiClO$_4$ in the formula ratio of about 8:1. These electrolytes typically have a resistivity of 10$^6$ to 10$^7$ ohm cm at low temperatures and when dry are to be put on at a thickness of typically 50 $\mu$m. This means an electrolyte resistance (R) of 5×10$^3$ to 5×10$^4$ ohm/cm$^2$ and the total transferred lithium charge (C) equivalent to 0.015 Coulombs/cm$^2$ which might be required would need a voltage (E) over a time (t) given by $$E = \frac{CR\alpha}{t}$$

There will be a spreading resistance arising from the island-like geometry which will approximately double the effective resistance, hence the factor $\alpha(\approx 2)$. Thus, for the values given and with t=60 sec., E is in the range 2.5 to 25 volts.

The separation distance of the islands of guest metal sink material is preferably comparable to or is less than the thickness of the electrolyte layer so as to ensure an acceptable uniform colouration of the colourable electrochromic layer.

In the construction of such a window it is important that the electrolyte does not come into contact with the ITO as this would provide a conduction path avoiding the island sites of electrochromic material. A procedure for avoiding this is shown in FIG. 6a–c. An overlayer structure is made e.g. from sputtered $SiO_2$ or evaporated $MgF_2$, with holes through which the islands of electrochromic material may contact the ITO. Of the various methods for the fabrication of such a "Swiss cheese" coating, the best is to use a photo-resist layer 123 over the conducting layer 112 which leaves islands 124 where the holes are finally to be when exposed and developed (FIG. 6b). $SiO_2$ or $MgF_2$ (113b) is coated over this configuration and then the photo-resist soaked in a suitable solvent so as to give "lift-off". The photo-resist is then removed with another solvent yielding the structure shown in FIG. 6d. The $WO_3$ layer 113a or other host material is then evaporated (or sputtered) onto the "Swiss cheese" structure through a metal mask which is held in registration with the holes (FIG. 6e).

Suitable arrangements are made for sealing and electrical contacts as described previously.

The guest metal sink material forming the islands need not of course be electrochromic so long as it can act as a supply of and sink for the guest metal atoms in the electrochemical cell constituted by the device.

Whilst the invention has been described with reference to particular characteristics of the preferred embodiments thereof, many modifications and variations are possible within the scope of the invention.

What is claimed is:

1. A variable transmission optical device comprising
   a first layer of a transparent electrically conductive material,
   a first layer of an electrochromic material comprising a metal-sensitive compound which is capable of dissolving guest metal atoms and which changes colour in so doing,
   a layer of a transparent, solid electrolyte, the solid electrolyte being a fast ion conductor in which a fast ion is an ion of the metal which dissolves in the said metal-sensitive compound to change the colour thereof,
   a discontinuous transparent guest metal sink layer comprising a compound which is capable of dissolving the same metal atoms as the first electrochromic layer which guest metal sink layer comprises a distributed multitude of small areas at least substantially free of said compound,
   a second layer of transparent electrically conductive material,
   the said layers being positioned in the order specified, the said layer of solid electrolyte being in contact with the layer of electrochromic material and the guest metal sink layer, and the said first and second conductive layers being in contact with the electrochromic layer and the guest metal sink layer respectively,
   there being provided in the device a quantity of the said guest metal colouration atoms which may be transferred reversibly from the guest metal sink layer to the electrochromic layer by application of a potential difference between the said first and second electrically conductive layers, the layer of electrochromic material and the guest metal sink layer being chosen such that a given quantity of metal colouration atoms produces a colouration of greater density when dissolved in the electrochromic layer than when dissolved in the discontinuous guest metal sink layer, whereby the overall optical absorption of the device can be varied by transfer of metal atoms between the layer of electrochromic material and the guest metal sink layer.

2. A device as claimed in claim 1 in which the discontinuous guest metal sink layer and the electrochromic layer are made of the same electrochromic material.

3. A device as claimed in claim 1 in which the electrochromic material and the guest metal sink layer independently are oxide bronzes of a transition metal in its highest oxidation state.

4. A device as claimed in claim 3 in which each said oxide bronze is independently selected from the group comprising tungsten oxide ($WO_3$), molybdenum oxide ($MoO_3$), vanadium oxide ($V_2O_5$), iridium oxide ($IrO_2$) and niobium oxide ($Nb_2O_5$), and solid solutions of at least two thereof.

5. A variable transition optical device comprising a first layer of a transparent electrically conductive material,
   a first layer of an electrochromic material comprising a metal-sensitive compound which is capable of dissolving guest metal atoms and which changes colour in doing so,
   a layer of a transparent, solid electrolyte, the solid electrolyte being a fast ion conductor in which a fast ion is an ion of the metal which dissolves in the said metal-sensitive compound to change the colour thereof,
   a transparent guest metal sink comprising a solid solution of $MoO_3$ and $V_2O_5$ which is capable of dissolving the same metal atoms as the first electrochromic layer,
   a second layer of transparent electrically conductive material,
   the said layers being positioned in the order specified, the said layer of solid electrolyte being in contact with the layer of electrochromic material and the guest metal sink layer, and the said first and second conductive layers being in contact with the electrochromic layer and the guest metal sink layer respectively,
   there being provided in the device a quantity of the said metal colouration atoms which may be transferred reversibly from the guest metal sink layer to the electrochromic layer by application of a potential difference between the said first and second electrically conductive layers.

6. A device as claimed in claim 5 wherein the formula ratio of $MoO_3$ to $V_2O_5$ is substantially 1:1.

7. A device as claimed in claim 1 wherein the discontinuous layer is formed as a network of guest metal sink material.

8. A device as claimed in claim 1 wherein the discontinuous layer provides a multitude of islands of guest metal sink material.

9. A device as claimed in claim 1 wherein the compound in the discontinuous layer occupies from 1/50 to ½ the area of the layer.

10. A device as claimed in claim 9 wherein the compound in the discontinuous layer occupies about 1/10 of the area of the layer.

11. A device as claimed in claim 1 wherein an insulating layer is provided between the solid electrolyte and the second layer of electrically conductive material having a pattern complimentary to that of the layer of the guest metal sink material so that the guest metal sink material occupies spaces in the layer of insulating material.

12. A device as claimed in claim 1 in which the materials used, and the quantity of colouration atoms present, are such that substantially all the colouration atoms can be transferred from the electrochromic layer to the guest metal sink layer by application of appropriate electrical potential differences between the two electrically conductive layers.

13. A device as claimed in claim 1 in which the said solid electrolyte comprises a solid electrolyte of the kind known as Bordeaux glass containing LiCl, $Li_2O$, and $B_2O_3$.

14. A device as claimed in claim 1 wherein the solid electrolyte is a polymer electrolyte.

15. A device as claimed in claim 14 wherein the polymer electrolyte is of the type $(LiClO_4)(PEO)_8$.

16. A device as claimed in claim 1 in which the fast ion is an alkali metal selected from the group comprising lithium, sodium or potassium.

17. A method for producing a variable transmission optical device comprising a first layer of a transparent electrically conductive material, a first layer of an electrochromic material comprising a metal-sensitive compound which is capable of dissolving guest metal atoms and which changes colour in so doing, a layer of transparent, solid electrolyte, the solid electrolyte being a fast ion conductor in which a fast ion is an ion of the metal which dissolves in the said metal-sensitive compound to change the colour thereof, a discontinuous transparent guest metal sink layer comprising a compound which is capable of dissolving the same metal atoms as the first electrochromic layer which guest metal sink layer comprises a distributed multitude of small areas at least substantially free of said compound, a second layer of transparent electrically conductive material, the said layers being positioned in the order specified, the said layer of solid electrolyte being in contact with the layer of electrochromic material and the guest metal sink layer, and the said first and second conductive layers begin in contact with the electrochromic layer and the guest metal sink layer respectively, there being provided in the device a quantity of the said guest metal colouration atoms which may be transferred reversibly to the electrochromic layer by application of a potential difference between the said first and second electrically conductive layers, the layer of electrochromic material and the guest metal sink layer being chosen such that a given quantity of metal colouration atoms produces a colouration of greater density when dissolved in the electrochromic layer than when dissolved in the discontinuous guest metal sink layer, whereby the overall optical absorption property of the device can be varied by transfer of metal atoms between the layer of electrochromic material and the guest metal sink layer, wherein an insulating layer is provided between the solid electrolyte and the electrically conductive material having a pattern complimentary to that of the layer of the guest metal sink material, so that the guest metal sink material occupies spaces in the layer of insulating material, which method comprises:

providing over a respective surface of electrically conductive material a layer of photo-resist;

exposing the photo-resist with a pattern the negative of the desired insulating layered pattern;

developing the photo-resist to leave a said negative pattern of photo-resist;

depositing the insulating layer over the electrically conductive material and the photo-resist;

stripping off the photo-resist to leave the positive pattern of insulating material;

depositing the desired guest metal sink material over the remaining area of the electrically conductive material; and depositing or otherwise providing the remaining layers of the device.

* * * * *